(12) United States Patent
Sankaran et al.

(10) Patent No.: US 10,938,722 B2
(45) Date of Patent: Mar. 2, 2021

(54) IN-BAND TELEMETRY CONGESTION CONTROL SYSTEM

(71) Applicant: Dell Products L.P., Round Rock, TX (US)

(72) Inventors: Ganesh Chennimalai Sankaran, TamilNadu (IN); Balaji Venkat Venkataswami, TamilNadu (IN)

(73) Assignee: Dell Products L.P., Round Rock, TX (US)

( * ) Notice: Subject to any disclaimer, the term of this patent is extended or adjusted under 35 U.S.C. 154(b) by 139 days.

(21) Appl. No.: 16/159,243

(22) Filed: Oct. 12, 2018

(65) Prior Publication Data

US 2020/0120029 A1   Apr. 16, 2020

(51) Int. Cl.

| | |
|---|---|
| *H04L 12/801* | (2013.01) |
| *H04L 12/753* | (2013.01) |
| *H04L 12/927* | (2013.01) |
| *H04L 12/851* | (2013.01) |
| *H04L 29/06* | (2006.01) |
| *H04L 12/721* | (2013.01) |
| *H04L 12/44* | (2006.01) |

(52) U.S. Cl.
CPC .............. *H04L 47/12* (2013.01); *H04L 12/44* (2013.01); *H04L 45/38* (2013.01); *H04L 45/48* (2013.01); *H04L 47/2483* (2013.01); *H04L 47/803* (2013.01); *H04L 69/22* (2013.01)

(58) Field of Classification Search
CPC ......... H04L 12/44; H04L 45/38; H04L 45/48; H04L 47/12; H04L 47/2483
See application file for complete search history.

(56) References Cited

U.S. PATENT DOCUMENTS

| | | | |
|---|---|---|---|
| 6,122,254 A * | 9/2000 | Aydemir | H04L 47/10 370/235 |
| 10,320,681 B2 * | 6/2019 | Hira | H04L 43/0864 |
| 10,320,691 B1 * | 6/2019 | Matthews | H04L 45/74 |
| 2019/0222481 A1 * | 7/2019 | Hira | H04L 43/10 |

* cited by examiner

*Primary Examiner* — Rhonda L Murphy
(74) *Attorney, Agent, or Firm* — Haynes and Boone, LLP

(57) ABSTRACT

An in-band telemetry congestion notification system includes a source device that generates and transmits packets. Each of a plurality of switch devices receives each of the packets, provides in-band telemetry information in each of the packets, and transmits each of the packets to a destination device. When the destination device receives a first subset of the packets, it uses the in-band telemetry information included in each of the first subset of the packets to determine a telemetry information baseline. Subsequent to determining the telemetry information baseline, when the destination device receives a second subset of the packet, it uses the in-band telemetry information included in each of the second subset of the packets to determine a departure from the telemetry information baseline that indicates congestion and, in response, generates a congestion notification and transmits the congestion notification via the plurality of switch devices to the source device.

20 Claims, 8 Drawing Sheets

IN-BAND TELEMETRY CONGESTION CONTROL SYSTEM

BACKGROUND

The present disclosure relates generally to information handling systems, and more particularly to providing congestion control for information handling systems using in-band telemetry.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, storage devices, and/or switch devices, are often coupled together in a network. For example, switch devices such as spine switch devices, leaf switch devices, and Top Of Rack (TOR) switch devices are often coupled together, with the TOR switch devices coupled to server devices, in order to allow the server devices to communicate with each other. In many situations, the server devices may communicate data packet streams back and forth with each other via network paths in the network that utilize particular subsets of the switch devices. When a switch device in the network fails or otherwise becomes unavailable, any data packet stream provided via a network path that utilizes that switch device must be rerouted through another switch device that is available. However, while available, that switch device that receives the rerouted data stream may have previously been handling other data packet streams, and the rerouting of an additional data packet stream to that switch device can cause congestion in that switch device that can limit or even prevent the provisioning of any of the data packet streams being handled by that switch device from reaching their destination devices.

Accordingly, it would be desirable to provide an improved congestion control system.

SUMMARY

According to one embodiment, an Information Handling System (IHS) includes a processing system; and a memory system that is coupled to the processing system and that includes instructions that, when executed by the processing system, cause the processing system to provide an in-band telemetry congestion control engine that is configured to: receive, via a plurality of switch devices, a first subset of a plurality of packets that were generated and transmitted by a source device; determine, using in-band telemetry information provided in each of the first subset of the plurality of packets by at least some of the plurality of switch devices, a telemetry information baseline; receive, via the plurality of switch devices and subsequent to determining the telemetry information baseline, a second subset of the plurality of packet that were generated by the source device; determine, using the in-band telemetry information provided in each of the second subset of the plurality of packets by at least some of the plurality of switch devices, a departure from the telemetry information baseline that indicates congestion and, in response, generate a congestion notification; and transmit, via the plurality of switch devices to the source device, the congestion notification.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O)

devices, such as a keyboard, a mouse, touchscreen and/or a video display. The information handling system may also include one or more buses operable to transmit communications between the various hardware components.

Figure 1:
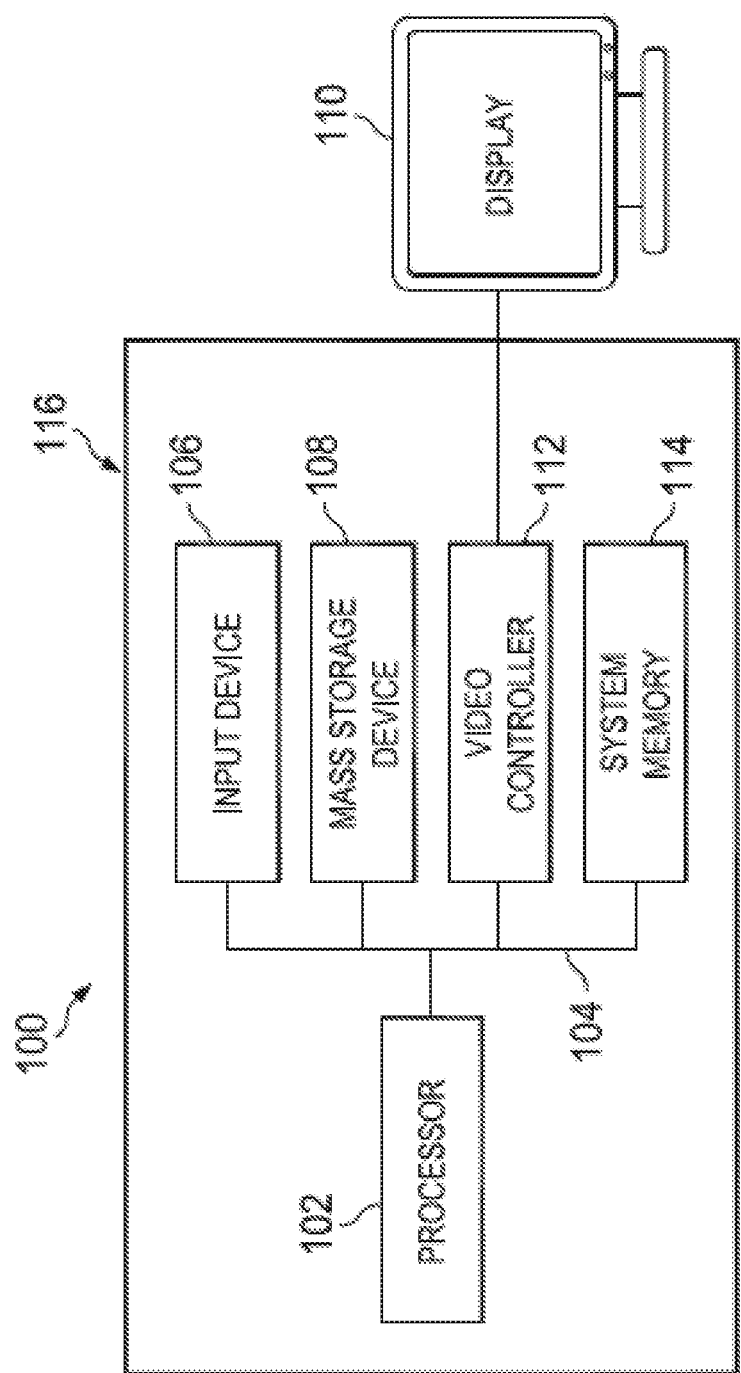
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
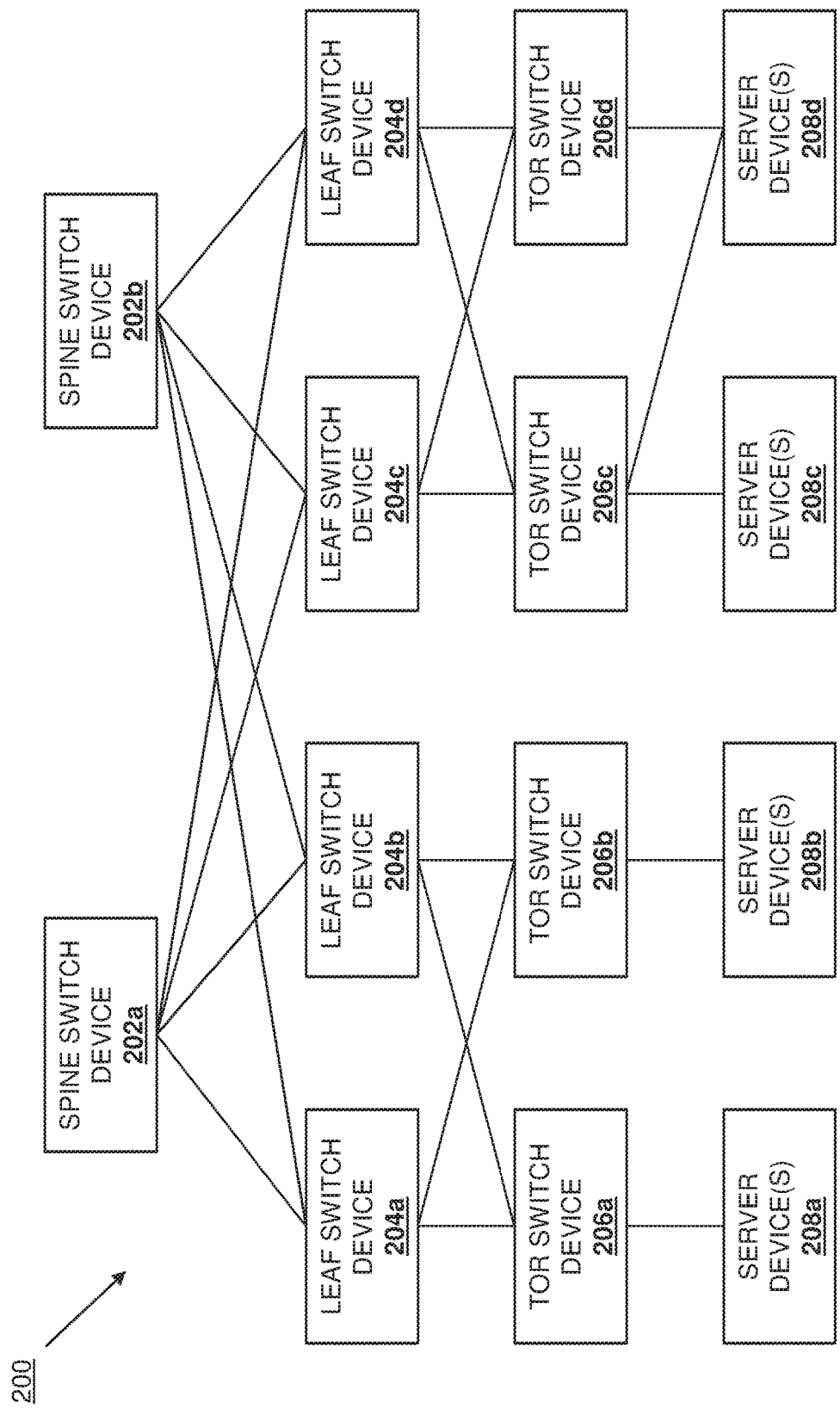
FIG. 2 is a schematic view illustrating an embodiment of an in-band telemetry congestion control system.

Referring now to FIG. 2, an embodiment of an in-band telemetry congestion control system 200 is illustrated. In the illustrated embodiment, the in-band telemetry congestion control system 200 includes a pair of spine switch devices 202a and 202b, either or both of which may be provided by the IHS 100 discussed above with reference to FIG. 1, and/or may include any or all of the components of the IHS 100. In a specific example, the spine switch devices 202a and 202b may be provided by any of a variety of switch devices, router devices, and/or other networking devices that would be apparent to one of skill in the art in possession of the present disclosure. While the illustrated embodiment includes only two spine switch devices 202a and 202b, one of skill in the art in possession of the present disclosure will recognize that datacenter networks, enterprise networks, server provider networks, and/or other networks will often include many more spine switch devices, and those networks will fall within the scope of the present disclosure as well.

In the illustrated embodiment, the spine switch devices 202a and 202b are each coupled to each of a plurality of leaf switch devices 204a, 204b, 204c, and 204d, any of which may be provided by the IHS 100 discussed above with reference to FIG. 1, and/or may include any or all of the components of the IHS 100. In a specific example, the leaf switch devices 204a-204d may be provided by any of a variety of switch devices, router devices, and/or other networking devices that would be apparent to one of skill in the art in possession of the present disclosure. While the illustrated embodiment includes only four spine switch devices 204a-204d, one of skill in the art in possession of the present disclosure will recognize that datacenter networks, enterprise networks, server provider networks, and/or other networks will often include many more leaf switch devices, and those networks will fall within the scope of the present disclosure as well.

In the illustrated embodiment, the leaf switch devices 204a and 204b are each coupled to each of a pair of Top Of Rack (TOR) switch devices 206a and 206b, and the leaf switch devices 204c and 204d are each coupled to each of a pair of TOR switch devices 206c and 206d. Any or all of the TOR switch devices 206a-206d may be provided by the IHS 100 discussed above with reference to FIG. 1, and/or may include any or all of the components of the IHS 100. In a specific example, the TOR switch devices 206a-206d may be provided by any of a variety of switch devices, router devices, and/or other networking devices that would be apparent to one of skill in the art in possession of the present disclosure. While the illustrated embodiment includes only four TOR switch devices 206a-206d, one of skill in the art in possession of the present disclosure will recognize that datacenter networks, enterprise networks, server provider networks, and/or other networks will often include many more TOR switch devices, and those networks will fall within the scope of the present disclosure as well.

In the illustrated embodiment, the TOR switch device 206a is coupled to one or more server devices 208a, the TOR switch device 206b is coupled to one or more server devices 208b, the TOR switch device 206c is coupled to one or more server devices 208c and one or more server devices 208d, and the TOR switch device 206d is coupled to one or more server devices 208d. Any or all of the server devices 208a-d may be provided by the IHS 100 discussed above with reference to FIG. 1, and/or may include any or all of the components of the IHS 100. In a specific example, the server devices 208a-208d may be provided by any of a variety of server devices provided in a server rack or chassis (e.g., with the server devices 208a in a first server rack, the server devices 208b in a second server rack, the server devices 208c in a third server rack, and the server devices 208d in a fourth server rack.) While the illustrated embodiment includes only four sets of server devices 208a-208d in respective server racks, one of skill in the art in possession of the present disclosure will recognize that datacenter networks, enterprise networks, server provider networks, /andor other networks will often include many more server devices, and those networks will fall within the scope of the present disclosure as well. Furthermore, one of skill in the art in possession of the present disclosure will recognize that the TOR switch devices 206c and 206d in the illustrated embodiment are "multi-homed" to the server devices 208, and that other TOR switch devices in the in-band telemetry congestion control system 200 may be multi-homed as well. While a specific in-band telemetry congestion control system 200 has been illustrated and described, one of skill in the art in possession of the present disclosure will recognize that in-band telemetry congestion control systems provided according to the teachings of the present disclosure may include different devices and/or device configurations while remaining within the scope of the present disclosure as well.

Figure 3:
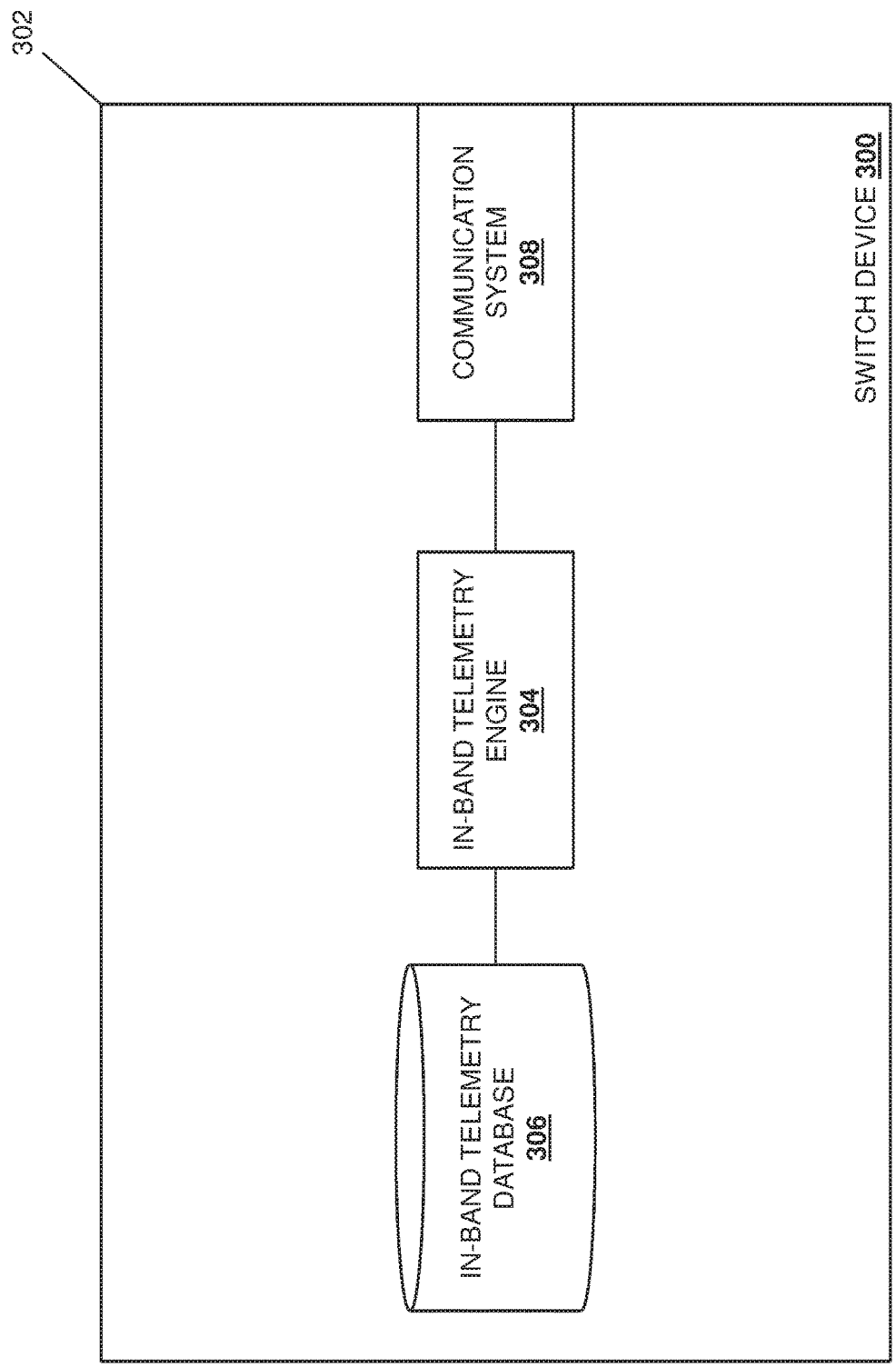
FIG. 3 is a schematic view illustrating an embodiment a switch device utilized in the in-band telemetry congestion control system.

Referring now to FIG. 3, an embodiment of a switch device 300 is illustrated that may be provided for any of the switch devices (e.g., the spine switch devices 202a and 202b, the leaf switch devices 204a-d, and the TOR switch devices 206a-d) discussed above with reference to FIG. 2. As such, the switch device 300 may be provided by the IHS 100 discussed above with reference to FIG. 1, and/or may include any or all of the components of the IHS 100. In the illustrated embodiment, the switch device 300 includes a chassis 302 that houses the components of the switch device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an in-band telemetry engine 304 that is configured to perform the functions of the in-band telemetry engines and switch devices discussed below. In a specific example, the in-band telemetry engine 304 may be enabled by software maintained by the P4 Language Consortium, which one of skill in the art will recognize provides a domain-specific programming language that allows for the programming of packet forward planes with constructs optimized around network data forwarding. However, other programming languages may enable the functionality described below, and thus are envisioned as falling within the scope of the present disclosure as well.

The chassis 302 may also house a storage system (not illustrated, but which may include the storage device 108 discussed above with reference to FIG. 1) that is coupled to the in-band telemetry congestion control engine 304 (e.g., via a coupling between the storage system and the processing system) and that includes an in-band telemetry database 306 that is configured to store any of the information utilized by the in-band telemetry engine 304 as discussed below. The chassis 302 may also house a communication system 308 that is coupled to the in-band telemetry engine 304 (e.g., via a coupling between the communication system 308 and the processing system) and that may be provided by a Network Interface Controller (NIC), a wireless communication subsystem (e.g., a BLUETOOTH® communication subsystem, a WiFI communication subsystem, a Near Field Communication (NFC) subsystem, etc.), and/or other communication components that would be apparent to one of skill in the art in possession of the present disclosure as providing, for example, the coupling of the switch device 300 to other switch devices and/or server devices (as illustrated in FIG. 2). While a specific switch device 300 has been illustrated and described, one of skill in the art in possession of the present disclosure will recognize that switch devices may include a variety of components and/or component configurations that provide for conventional switch device functionality, as well as the functionality discussed below, while remaining within the scope of the present disclosure.

Figure 4:
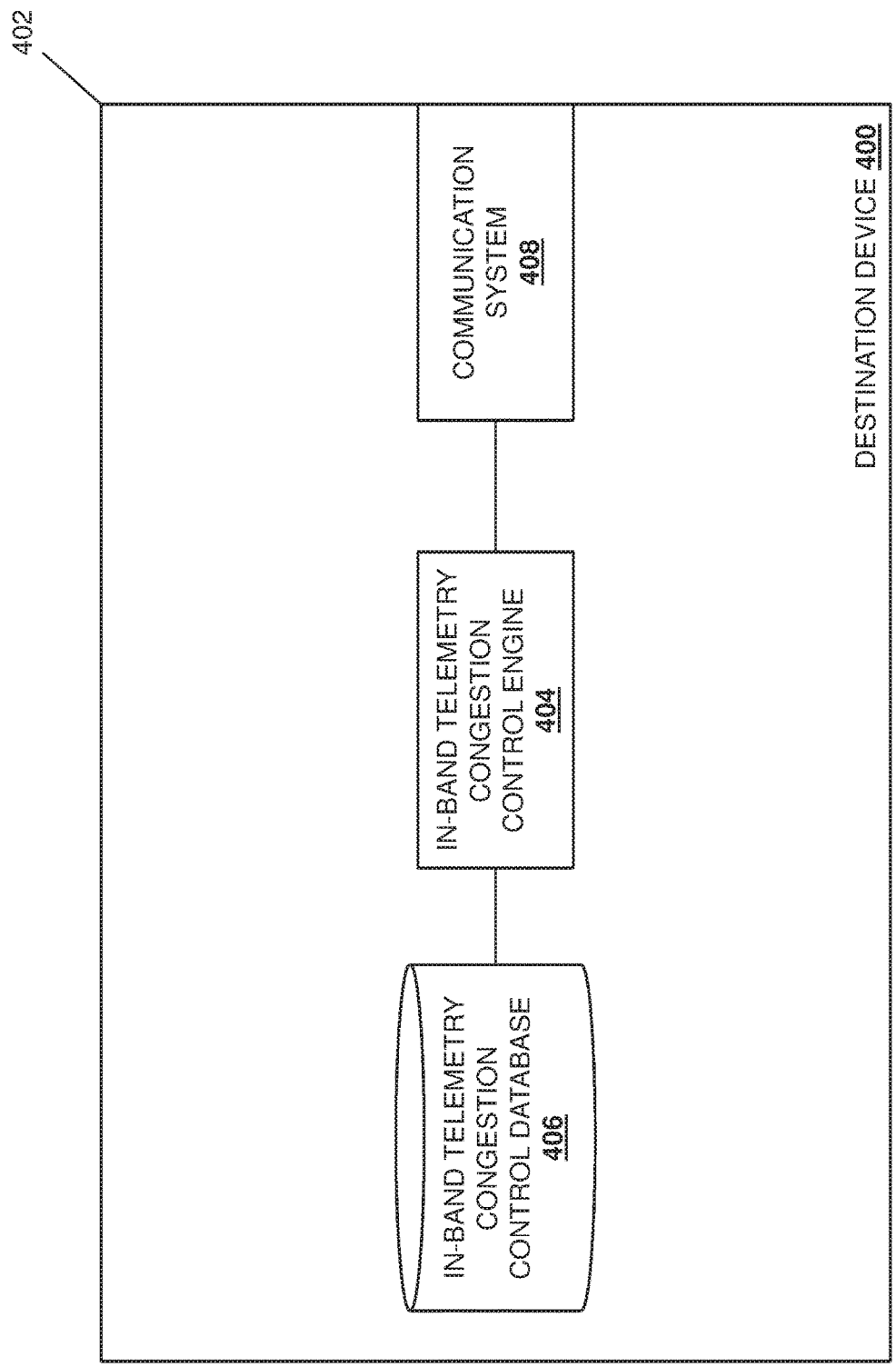
FIG. 4 is a schematic view illustrating an embodiment a destination device utilized in the in-band telemetry congestion control system.

Referring now to FIG. 4, an embodiment of a destination device 400 is illustrated that may be provided for any of the server devices 208a, 208b, 208c, and/or 208c discussed above with reference to FIG. 2. As such, the destination device 400 may be provided by the IHS 100 discussed above with reference to FIG. 1, and/or may include any or all of the components of the IHS 100. In the illustrated embodiment, the destination device 400 includes a chassis 402 that houses the components of the destination device 400, only some of which are illustrated in FIG. 4. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an in-band telemetry congestion control engine 404 that is configured to perform the functions of the in-band telemetry congestion control engines and destination devices discussed below.

The chassis 402 may also house a storage system (not illustrated, but which may include the storage device 108 discussed above with reference to FIG. 1) that is coupled to the in-band telemetry congestion control engine 404 (e.g., via a coupling between the storage system and the processing system) and that includes an in-band telemetry congestion control database 406 that is configured to store any of the information utilized by the in-band telemetry congestion control engine 404 as discussed below. The chassis 402 may also house a communication system 408 that is coupled to the in-band telemetry congestion control engine 404 (e.g., via a coupling between the communication system 408 and the processing system) and that may be provided by a Network Interface Controller (NIC), a wireless communication subsystem (e.g., a BLUETOOTH® communication subsystem, a WiFI communication subsystem, a Near Field Communication (NFC) subsystem, etc.), and/or other communication components that would be apparent to one of skill in the art in possession of the present disclosure as providing, for example, the coupling of the destination device 400 to TOR switch devices (as illustrated in FIG. 2). While a specific destination device 400 has been illustrated and described, one of skill in the art in possession of the present disclosure will recognize that destination devices may include a variety of components and/or component configurations that provide for conventional destination device functionality, as well as the functionality discussed below, while remaining within the scope of the present disclosure.

Figure 5:
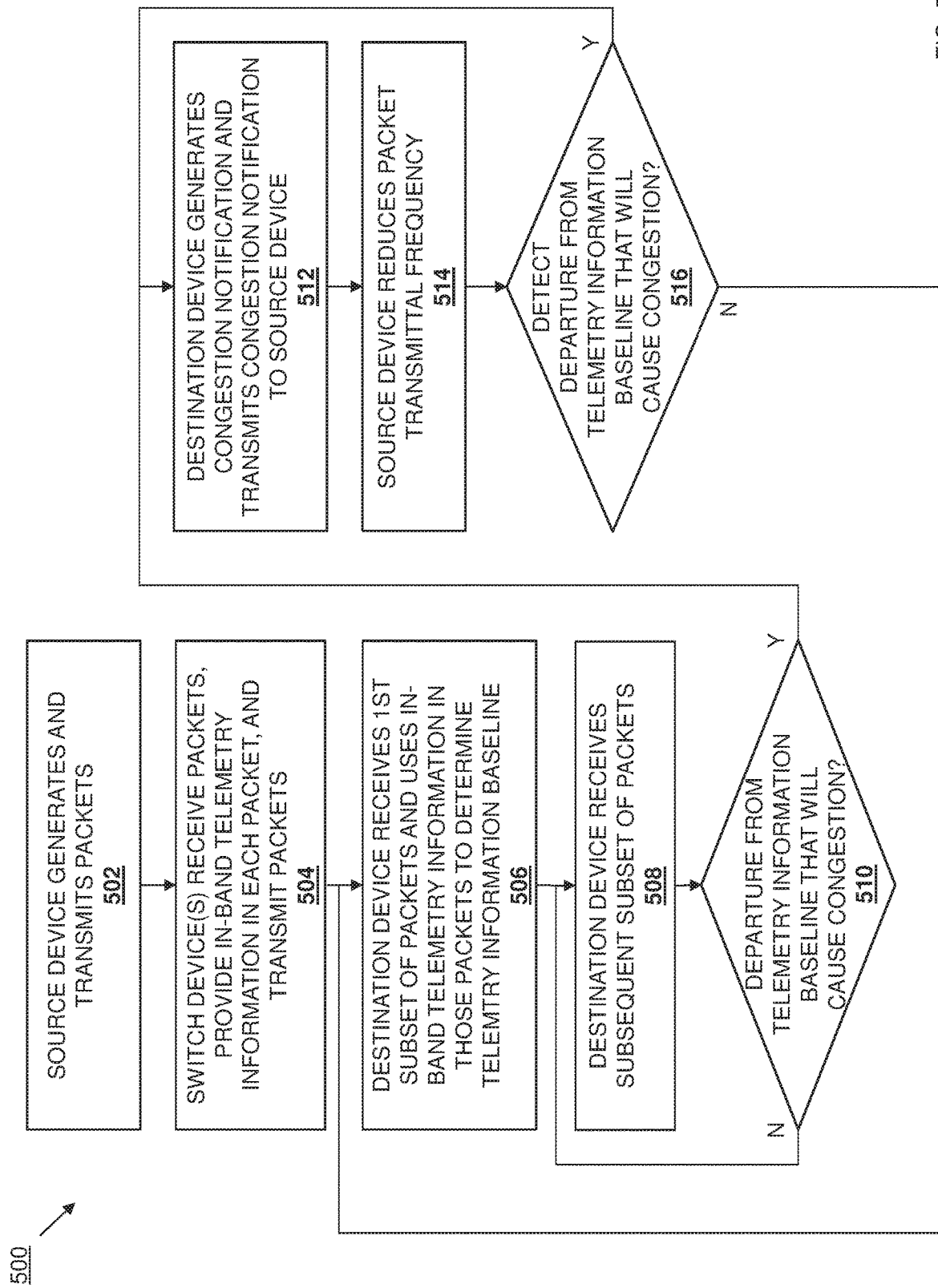
FIG. 5 is a flow chart illustrating an embodiment of a method for providing in-band telemetry congestion control.

Referring now to FIG. 5, an embodiment of a method 500 for in-band telemetry congestion control is illustrated. As discussed below, the systems and methods of the present disclosure utilize in-band telemetry information provided in packets transmitted through a network via devices that have been programmed using, for example, the P4 programming language available from the P4 Language Consortium, in order to detect and control congestion in that network. For example, switch devices that transmit packets between a source device and a destination device in a network may provide in-band telemetry information in those packets that may include, for example, switch device identifiers, queue occupancy data, and/or other in-band telemetry information. The destination device may receive a first subset of the packets, and use the in-band telemetry information in those packets to determine a telemetry information baseline, which may include a sequence of switch device identifiers that identifies a network path of the packets, queue occupancies that identify the queue occupancy of switch devices along a network path of the packets, and/or other telemetry information baselines. When the destination device receives a subsequent subset of packets, it will determine whether the in-band telemetry information in those packets indicates a departure from the telemetry information baseline (e.g., a switch device identifier that was not part of the sequence of switch device identifiers in the telemetry information baseline, a queue occupancy that is outside the average queue occupancy in the telemetry information baseline, etc.). Departures from the telemetry information baseline are indicative of congestions situations that can arise from, for example, a switch device failure in the original network path of the packets that caused those packets to be rerouted along a new network path, and may cause the destination device to generate a congestion notification (e.g., an Explicit Congestion Notification (ECN)) and send that congestion notification to the source device, which causes the source device reduce its packet transmittal frequency as to not overwhelm the switch devices that provide the new network path.

The method 500 begins at block 502 where a source device generates and transmits packets. In the embodiments discussed below, the source device is provided by the server device 208a, which may operate at block 502 to generate and transmit packets. For example, the server device 208a may be programmed using programming languages such, for example, the P4 programming language available from the P4 Language Consortium and/or other programming languages that one of skill in the art would recognize would provide for the functionality discussed below, and some or all of the packets generated by the server device 208a at block 502 may include a packet header and/or other metadata storage that is configured to receive in-band telemetry information from switch devices that handle those packets, as discussed in further detail below. In the specific examples discussed below, the in-band telemetry packet header and/or metadata storage in the packets generated by the server device 208a at block 502 may be configured to receive, from any properly configured switch devices that handles those packets, a switch device identifier for that switch, queue occupancy data that describes the occupancy of the queue in that switch device, and/or other in-band telemetry information that would be apparent to one of skill in the art in possession of the present disclosure. The packets generated by the server device 208a may then be transmitted to the switch devices in the in-band telemetry congestion control system 200 and via the network provided therein. One of skill in the art in possession of the present disclosure will recognize that the server device 208a may continually or periodically generate and transmit packets throughout the method 500 while remaining within the scope of the present disclosure.

Figure 6:
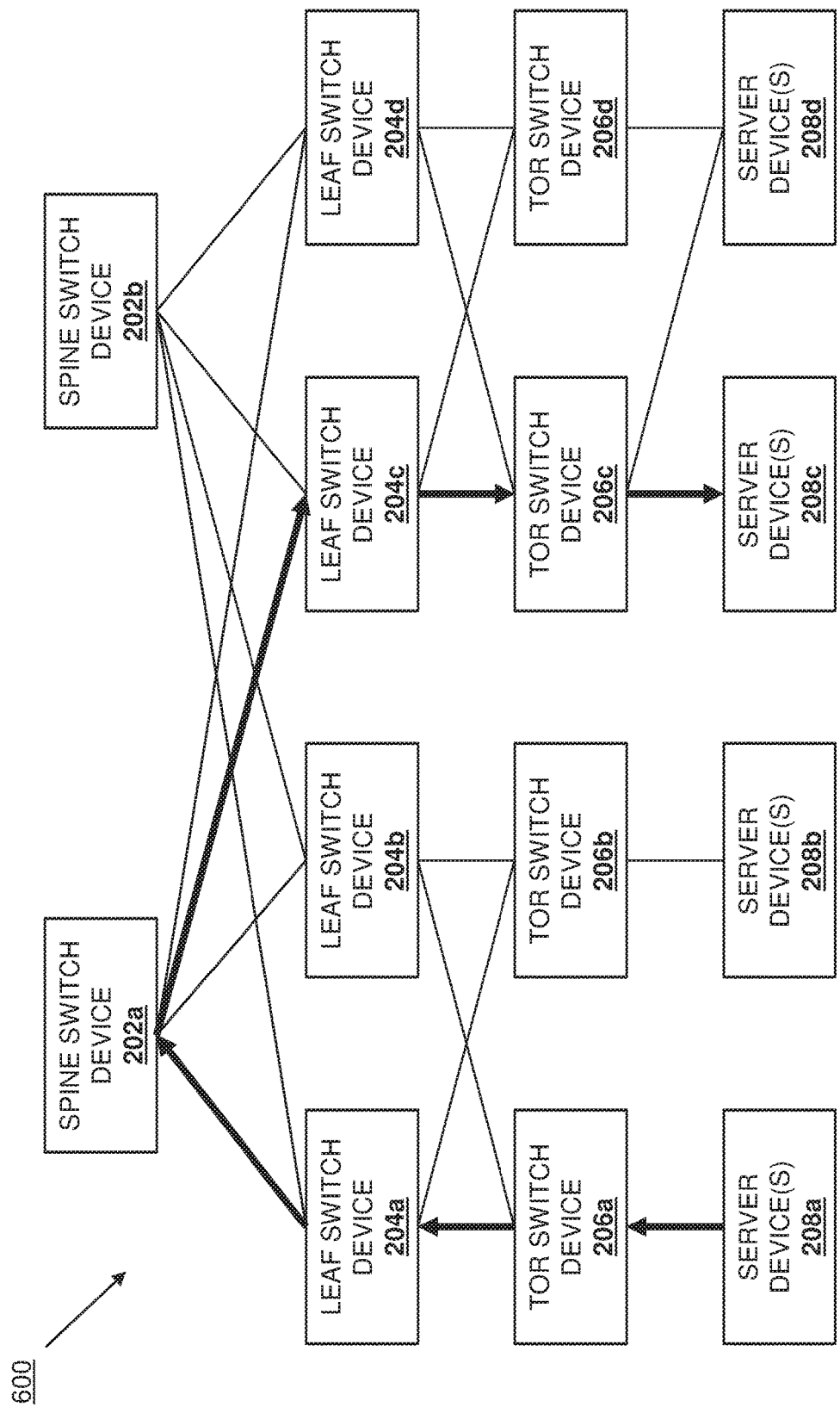
FIG. 6 is a schematic view illustrating an embodiment of an initial data packet stream being provided on a first network path through the in-band telemetry congestion control system of FIG. 2 prior to a switch device failure.

The method 500 then proceeds to block 504 where one or more switch devices receive the packets, provide in-band telemetry information in one or more of those packets, and transmit the packets. In an embodiment, at block 504, any of the switch devices in the in-band telemetry congestion control system 200 may receive the packets transmitted by the source device at block 502. For example, FIG. 6 illustrates an embodiment of a network path 600 of a first subset of packets (identified by the bolded arrows) generated and transmitted by the server device 208a, which are received by the TOR switch device 206a and transmitted to the leaf switch device 204a, received by the leaf switch device 204a and transmitted to the spine switch device 202a, received by the spine switch device 202a and transmitted to the leaf switch device 204c, received by the leaf switch device 204c and transmitted to the TOR switch device 206c, and received by the TOR switch device 206c and transmitted to the server device(s) 208c. One of skill in the art in possession of the present disclosure will recognize that the network path 600 illustrated in FIG. 6 may be determined by forwarding rules in each of the switch devices in that network path 600, and packets transmitted by different server devices will be generated and transmitted by switch devices along a variety of different network paths that will include a variety of different switch devices while remaining within the scope of the present disclosure.

Subsequent to any of the switch devices in the network path 600 receiving any of the first subset of packets generated by the server device 208a, and prior to that switch device transmitting any of those first subset of packets to another switch device (or the destination device/server device 208c illustrated in the network path 600 of FIG. 6), that switch device may provide in-band telemetry information in each of those packets. For example, with reference to FIG. 3, the in-band telemetry engine 304 included in the switch device 300 may receive any of the first subset of packets generated by the server device 208a via the communication system 308. In response, the in-band telemetry engine 304 may provide in-band telemetry information in the in-band telemetry packet header or metadata storage included in any or all of those packets. For example, at block 504, the in-band telemetry engine 304 may retrieve a switch device identifier (e.g., from the in-band telemetry database 306) that identifies the switch device 300, and provide that switch device identifier in any or all of the first subset of packets (i.e., any or all of the first subset of packets may continually or periodically be provided with switch device identifiers by the switch device(s)). Similarly, at block 504, the in-band telemetry engine 304 may retrieve queue occupancy data (e.g., from the in-band telemetry database 306) that identifies a queue occupancy of a queue in the switch device 300, and provide that queue occupancy data in any or all of the first subset of packets (i.e., any or all of the first subset of packets may continually or periodically include queue occupancy data by the switch device(s)). While a few examples of in-band telemetry information provided in the first subset of packets has been described, one of skill in the art in possession of the present disclosure will recognize that any of a variety of in-band telemetry information known in the art may be provided in the first subset of packets by any of the switch devices transmitting those packets through the network while remaining within the scope of the present disclosure. Following the provisioning of the in-band telemetry information in any of the first subset of packets, the in-band telemetry engine 304 may then transmit those packets through the network via the communication system 308.

With reference back to the network path 600 illustrated in FIG. 6, at block 504, the TOR switch device 206a may provide its TOR switch device identifier, queue occupancy data for a queue in the TOR switch device 206a, and/or other in-band telemetry information in any of the first subset of packets received from the server device 208a, and transmit those packets to the leaf switch device 204a. The leaf switch device 204a may then provide its leaf switch device identifier, queue occupancy data for a queue in the leaf switch device 204a, and/or other in-band telemetry information in any of the first subset of packets received from the TOR switch device 206a, and transmit those packets to the spine switch device 202a. The spine switch device 202a may then provide its spine switch device identifier, queue occupancy data for a queue in the spine switch device 202a, and/or other in-band telemetry information in any of the first subset of packets received from the leaf switch device 204a, and transmit those packets to the leaf switch device 204c.

The leaf switch device 204c may then provide its leaf switch device identifier, queue occupancy data for a queue in the leaf switch device 204c, and/or other in-band telemetry information in any of the first subset of packets received from the spine switch device 202a, and transmit those packets to the TOR switch device 206c. The TOR switch device 206c may then provide its TOR switch device identifier, queue occupancy data for a queue in the TOR switch device 206c, and/or other in-band telemetry information in any of the first subset of packets received from the leaf switch device 204c, and transmit those packets to the server device(s) 208c. As would be understood by one of skill in the art in possession of the present disclosure, the switch devices in the network path 600 may add the in-band telemetry information in a "stack" fashion in the in-band telemetry information packet header or metadata storage of each packet. While each of the switch devices in the network path 600 have been described as providing in-band telemetry information in the first subset of packets at block 504, one of skill in the art in possession of the present disclosure will recognize that some switch device(s) in the network path 600 may not provide in-band telemetry information in one or more of the first subset of packets (i.e., those switch device(s) may simply receive and forward the first subset of packets) while remaining within the scope of the present disclosure.

The method 500 then proceeds to block 506 where a destination device receives a first subset of packets and uses the in-band telemetry information in those packets to determine a telemetry information baseline. In the embodiments discussed below, the destination device 400 is provided by the server device 208c, and the in-band telemetry congestion control engine 404 in the server device 208c may operate at block 506 to receive the first subset of packets generated by the source device/server device 208a via its communication system 508, and use the in-band telemetry information in those packets to generate a telemetry information baseline. In some example, the in-band telemetry congestion control engine 404 in the server device 208c may define a number of packets in the first subset of packets that is necessary for a determination of the telemetry information baseline, and then receive packets from the TOR switch device 208c that were generated by the server device 208a, identify the in-band telemetry information in the first subset of those packets, and use that in-band telemetry information to determine a telemetry information baseline. In a specific example, the first subset of packets include approximately 100 packets such that 100 samples of the in-band telemetry information may be used to determine the telemetry information baseline (e.g., the most recent 100 packets in the data packet stream may include telemetry information, which may be analyzed continuously or periodically to determine the telemetry information baseline). In another specific example, the first subset of packets may be received over 25-30 seconds, which is an approximate time utilized by conventional switch devices to reach packet forwarding stability, as well as an approximate time over which queue occupancy exhaustion may be considered "consistent".

Continuing with one of the examples provided above, the in-band telemetry information provided in the first subset of packets may include switch identifiers for each switch device that transmitted those packets along the network path 600. As such, assuming each of the switch devices in the network path 600 remains available and/or operates at full capacity during the transmittal of the first subset of packets between the server device 208a and the server device 208c, the in-band telemetry information in each of the first subset of packets may include the same sequence of switch device identifiers (e.g., the TOR switch device identifier for the TOR switch device 206a, the leaf switch device identifier 204a for the leaf switch device 204a, the spine switch device identifier for the spine switch device 202a, the leaf switch device identifier for the leaf switch device 204c, and the TOR switch device identifier for the TOR switch device 206c in the embodiment illustrated in FIG. 6). Thus, the in-band telemetry congestion control engine 404 in the server device 208c may determine a telemetry information baseline that includes a sequence of switch device identifiers included in the first subset of packets that identify the switch devices that provide the network path 600 for that first subset of packets.

Continuing with another of the examples provided above, the in-band telemetry information provided in the first subset of packets may include queue occupancy data for queues in each switch device that transmitted those packets along the network path 600. As such, assuming each of the switch devices in the network path 600 remains available and/or operates at full capacity during the transmittal of the first subset of packets between the server device 208a and the server device 208c, the in-band telemetry information in each of the first subset of packets may include queue occupancy data for queues in each switch device (e.g., queue occupancy data for a queue in the TOR switch device 206a when transmitting any or all of the first subset of packets, queue occupancy data for a queue in the leaf switch device 204a when transmitting any or all of the first subset of packets, queue occupancy data for a queue in the spine switch device 202a when transmitting any or all of the first subset of packets, queue occupancy data for a queue in the leaf switch device 204c when transmitting any or all of the first subset of packets, and queue occupancy data for a queue in the TOR switch device 206c when transmitting any or all of the first subset of packets in the embodiment illustrated in FIG. 6). Thus, the in-band telemetry congestion control engine 404 in server device 208c may determine a telemetry information baseline that includes, for example, an average queue occupancy in any or all of the switch devices when transmitting the first subset of packets along the network path 600.

While specific examples of switch device identifier and/or queue occupancy based telemetry information baselines have been described, one of skill in the art in possession of the present disclosure will recognize that other in-band telemetry information may enable the congestion identification functionality discussed below, and the provisioning of that in-band telemetry information in packets, and subsequent use of that in-band telemetry information to determine a telemetry information baseline, will fall within the scope of the present disclosure as well. In particular, any switch device information that may develop a baseline over the transmission of some subset of packets, and then change in the event of a congestion situation (or imminent congestion situation), is envisioned as being provided and utilized as in-band telemetry information according to the teachings of the present disclosure.

The method 500 then proceeds to block 508 where the destination device receives a subsequent subset of packets. In an embodiment, at block 508, the in-band telemetry congestion control engine 404 in the server device 208c may receive a subsequent subset of packets that were generated by the source device 208a via its communication system 408. Similarly to the first subset of packets discussed above, the source device/server device 208a may continue to generate packets and transmit those packets through the network provided in the in-band telemetry congestion control system 200. As discussed below, in some embodiments, at block 508, the subsequent subset of packets received by the server device 208c may be transmitted through the network from the server device 208a by the same switch devices (i.e., the TOR switch device 206a, the leaf switch device 204s, the spine switch device 202a, the leaf switch device 204c, and the TOR switch device 206c providing the network path 600 in FIG. 6), while in other embodiments, the subsequent subset of packets received by the server device 208c may be transmitted through the network from the server device 208a by at least one different switch device (i.e., at least one switch device that did not help to provide the network path 600 illustrated in FIG. 6.) As such, the subsequent subset of packets may be any packets transmitted following the establishment of the telemetry information baseline.

The method 500 then proceeds to decision block 510 where the destination device determines whether a departure from the telemetry information baseline that indicates congestion has been detected. In an embodiment, at decision block 510, the in-band telemetry congestion control engine 404 in the server device 208c may identify the in-band telemetry information received in the subsequent subset of packets received at block 508, and analyze the in-band telemetry to detect whether a departure from the telemetry information baseline has occurred. As such, at decision block 508, the in-band telemetry congestion control engine 404 in the server device 208c may identify switch device identifiers provided in the subsequent subset of packets by the switch devices that transmitted the subsequent subset of packets from the server device 208a to the server device 208c, and make a determination of whether any of those switch device identifiers are different than the switch device identifiers that were included in the telemetry information baseline. Similarly, at decision block 508, the in-band telemetry congestion control engine 404 in the server device 208c may identify queue occupancy data provided in the subsequent subset of packets by the switch devices that transmitted the subsequent subset of packets from the server device 208a to the server device 208c, and determine whether queue occupancies and/or other queue occupancy parameters have changed from those determined for the telemetry information baseline. While a few examples have been described, one of skill in the art in possession of the present disclosure will recognize how the in-band telemetry congestion control engine 404 in the server device 208c may identify any other in-band telemetry information that was provided in the subsequent subset of packets by the switch devices that transmitted the subsequent subset of packets from the server device 208a to the server device 208c, and determine whether that in-band telemetry information departs from the telemetry information baseline determined at block 506.

If, at decision block 510, the destination device determines that a departure from the telemetry information baseline has not been detected, the method 500 then returns to block 508 where the destination device receives a subsequent subset of packets. For example, the in-band telemetry information included in the subsequent subset of packets received at block 508 may include the same switch identifiers that were provided in the telemetry information baseline for each of the TOR switch device 206a, the leaf switch device 204s, the spine switch device 202a, the leaf switch device 204c, and the TOR switch device 206c that provided the network path 600 in FIG. 6, and the in-band telemetry congestion control engine 404 in the server device 208c will determine that no departure from the telemetry information baseline has occurred at decision block 510. Similarly, the in-band telemetry information included in the subsequent subset of packets received at block 508 may provide queue occupancies and/or other queue occupancy parameters that were provided in the telemetry information baseline and that indicate that the queue occupancy of the TOR switch device 206a, the leaf switch device 204s, the spine switch device 202a, the leaf switch device 204c, and the TOR switch device 206c that provided the network path 600 in FIG. 6 have not substantially changed, and the in-band telemetry congestion control engine 404 in the server device 208c will determine that no departure from the telemetry information baseline has occurred at decision block 510. While a few examples have been described, one of skill in the art in possession of the present disclosure will recognize how the in-band telemetry congestion control engine 404 in the server device 208c may determine that any other in-band telemetry information has not departed from the telemetry information baseline determined at block 506. As such, the method 500 may return to block 508, and loop through decision block 510 and block 508 until the destination device detects that a set of packets includes in-band telemetry information that departs from the telemetry information baseline.

Figure 7:
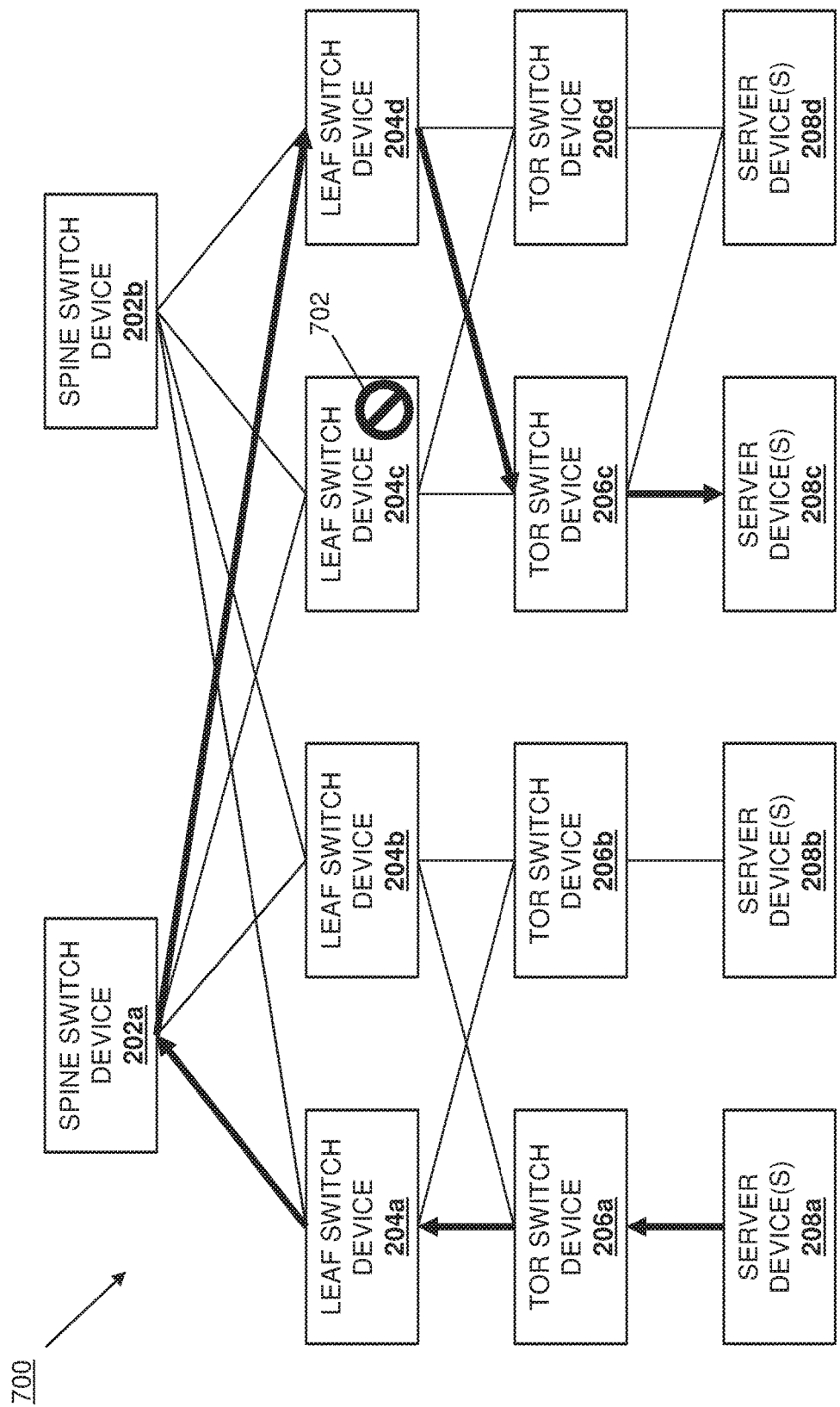
FIG. 7 is a schematic view illustrating an embodiment of a re-routed data packet stream being provided on a second network path through the in-band telemetry congestion control system of FIG. 2 subsequent to a switch device failure.

If, at decision block 510, the destination device determines that a departure from the telemetry information baseline has been detected, the method 500 then proceeds to block 512 where the destination device generates a congestion notification and transmits the congestion notification to the source device. With reference to FIG. 7, an embodiment of a network path 700 of a subsequent subset of packets (identified by the bolded arrows) is illustrated that were generated and transmitted by the server device 208a, received by the TOR switch device 206a and transmitted to the leaf switch device 204a, received by the leaf switch device 204a and transmitted to the spine switch device 202a, received by the spine switch device 202a and transmitted to the leaf switch device 204d, received by the leaf switch device 204d and transmitted to the TOR switch device 206c, and received by the TOR switch device 206c and transmitted to the server device(s) 208c. One of skill in the art in possession of the present disclosure will recognize that the network path 700 illustrated in FIG. 7 may have resulted from a failure or other unavailability of the leaf switch device 204c (as indicated by element 702) during provisioning of the network path 600 illustrated in FIG. 6, and may be determined by forwarding rules in each of the switch devices in that network path 700.

Using the example illustrated in FIG. 7, the in-band telemetry information included in the subsequent subset of packets received at block 508 may include switch identifiers for each of the TOR switch device 206a, the leaf switch device 204s, the spine switch device 202a, the leaf switch device 204d, and the TOR switch device 206c that provided the network path 700 in FIG. 7, and the in-band telemetry congestion control engine 404 in the server device 208c will determine that a departure from the telemetry information baseline has occurred at decision block 510 based on, for example, the inclusion of switch identifier for the leaf switch device 204d in the in-band telemetry information which is not present in the telemetry information baseline, and/or the absence of the switch identifier for the leaf switch device 204c in the in-band telemetry information which is present in the telemetry information baseline. As such, the in-band telemetry congestion control engine 404 in the server device 208c may interpret any change in the switch device identifiers defined in the telemetry information baseline (e.g., the addition and/or removal of at least one switch identifier) as a departure from the telemetry information baseline at decision block 510.

Similarly, the in-band telemetry information included in the subsequent subset of packets received at block 508 may include queue occupancies and/or other queue occupancy parameters that indicate at least one switch device queue occupancy has substantially changed, and the in-band telemetry congestion control engine 404 in the server device 208c will determine that a departure from the telemetry information baseline has occurred at decision block 510. For example, the queue occupancy data in the subsequent subset of packets may indicate that the queue occupancy of the queue in the leaf switch device 204d is substantially higher than the average queue occupancy that was present in the queue in the leaf switch device 204c according to the telemetry information baseline. One of skill in the art in possession of the present disclosure will recognize that, prior to the failure/unavailability of the leaf switch device 204c, the leaf switch device 204d may be transmitting packets generated by other switch devices and provided along other network paths, and the use of the leaf switch device 204d to provide the network path 700 may increase the queue occupancy of the queue in the leaf switch device 204d (e.g., above that which was present in the queue of the leaf switch device 204c prior to its failure and when it was helping provide the network path 600.)

Furthermore, while the switch identifiers and queue occupancy data in the subsequent subset of packets has been described as being utilized separately to determine whether a departure from the telemetry information baseline has occurred, one of skill in the art in possession of the present disclosure will recognize how the switch identifiers, queue occupancy data, and any other in-band telemetry information may be analyzed in any combination to determine whether a departure from the telemetry information baseline has occurred. For example, with reference to the network path 700 illustrated in FIG. 7, the switch identifiers in the in-band telemetry information included in the subsequent subset of packets may include the switch device identifier for the leaf switch device 204d that was not included in the telemetry information baseline, but the queue occupancy data included in the subsequent subset of packets may indicate that the leaf switch device 204d will not experience congestion (i.e., the queue in the leaf switch device 204d can handle the network path 700 without experiencing any congestion issues), and thus it may be determined that the departure from the telemetry information baseline will not cause congestion. Similarly, with reference to the network path 600 illustrated in FIG. 6, the switch identifiers in the in-band telemetry information included in the subsequent subset of packets may match the switch identifiers in the telemetry information baseline, but the queue occupancy data included in the subsequent subset of packets may indicate that at least one of the switch devices providing the network path 600 will experience congestion (i.e., the queue in that switch device can no longer handle the network path 600 without experiencing a congestion issues), and thus it may be determined that the departure from the telemetry information baseline will cause congestion.

Figure 8:
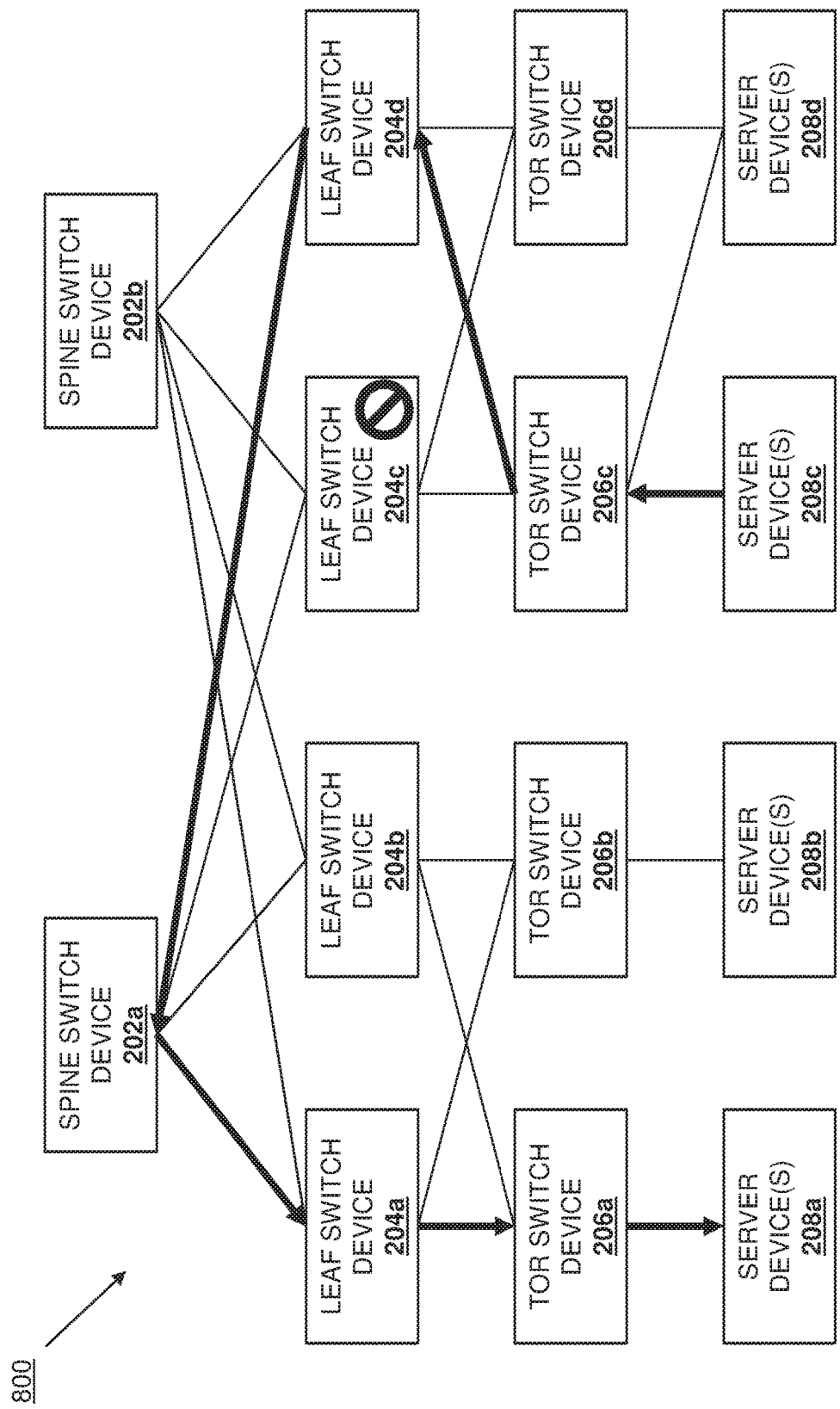
FIG. 8 is a schematic view illustrating an embodiment of a congestion notification being provided via the in-band telemetry congestion control system of FIG. 2 subsequent to a switch device failure.

In response to detecting the departure from the telemetry information baseline that indicates congestion, the in-band telemetry congestion control engine 404 in the server device 208c may generate a congestion notification such as, for example, an Explicit Congestion Notification (ECN) or other congestion notifications that would be apparent to one of skill in the art in possession of the present disclosure. The in-band telemetry congestion control engine 404 in the server device 208c may then transmit the congestion notification through the network via the switch devices and back to the server device 208a (acting as the source device). With reference to FIG. 8, an embodiment of a network path 800 is illustrated upon which a congestion notification may be sent by the server device 208c to the server device 208a via the TOR switch device 206c, the leaf switch device 204d, the spine switch device 202a, the leaf switch device 204a, and the TOR switch device 206a. For example, any Transmission Control Protocol (TCP) data stream that is being provided along the network path 700 (e.g., by the server device 208a) may have associated acknowledgements (ACKs) or other return traffic (e.g., from the server device 208c) marked with ECN bits. However, while a specific example of the provisioning of a congestion notification has been described, one of skill in the art in possession of the present disclosure will recognize that congestion notifications may be provided in a variety of manners that will fall within the scope of the present disclosure as well.

The method 500 then proceeds to block 514 where the source device reduces a packet transmittal frequency. In an embodiment, at block 514, the server device 208a may receive the congestion notification from the server device 208c and, in response, reduce the frequency at which it transmits packets through the network (e.g., along the network path 700) to the server device 208c. In a specific example, the congestion notification may indicate the duration for which the packet transmittal frequency should be reduced based on, for example, an expected time for failed/unavailable switch device recovery. As such, switch devices in the network path that may be experiencing congestion will have the portion of that congestion that is due to the packets transmitted by the server device 208a reduced. For example, with reference to the network path 700 discussed above with reference to FIG. 7, the failure/unavailability of the leaf switch device 204c may have caused the leaf switch device 204d (which took over the handling of the network path 700 from the leaf switch device 204c) to experience congestion, and the reduction in the packet transmittal frequency by the server device 208a will alleviate that congestion at block 514. Furthermore, one of skill in the art in possession of the present disclosure will recognize that any switch device in the in-band telemetry congestion control system 200 may have congestion alleviated in a similar manner while remaining within the scope of the present disclosure.

The method 500 then proceeds to decision block 516 where the destination device again determines whether a departure from the telemetry information baseline that indicates congestion has been detected. In an embodiment, at decision block 516, the in-band telemetry congestion control engine 404 in the server device 208c may again determine whether the departure from the telemetry information baseline that was causing congestion will continue to exist in substantially the same manner as described above with reference to decision block 510. As such, following the sending of the congestion notification, the in-band telemetry congestion control engine 404 in the server device 208c may receive packets sent (at the reduced packet transmittal frequency) by the server device 208a, and identify whether the in-band telemetry information provided in those packets by the switch devices providing the network path 700 indicates whether the departure from the telemetry information baseline is still occurring (i.e., whether there are still switch identifier(s) in that in-band telemetry information that were not part of the telemetry information baseline, whether an average queue occupancy of queue(s) in switch device(s) are still exceeding those in the telemetry information baseline, etc.)

If, at decision block 516, the destination device determines that the departure from the telemetry information baseline continues to be detected, the method 500 may then return to block 512 where the destination device may generate a congestion notification and transmit the congestion notification to the source device, and block 514 where the source device may reduce its packet transmittal frequency further, in substantially the same manner as described above. As such, as long as a departure from the telemetry information baseline continues, the method 500 may loop through decision block 516 and blocks 512 and 514 to send congestion notifications that cause the source device to reduce its packet transmittal frequency further. Thus, in some embodiments, the packet transmittal frequency of the source device may be reduced as long as a congestion situation (determined based on the in-band telemetry information) exists. However, in some example, only one reduction of the packet transmittal frequency by the source device may be performed, with that packet transmittal frequency reduction performed for some congestion-notification-specified time period, as discussed above.

If, at decision block 516, the destination device determines that the departure from the telemetry information baseline is no longer detected, the method 500 then returns to block 506 where the destination device again receives a first subset of packets and uses the in-band telemetry information in those packets to determine a telemetry information baseline. For example, following the sending of the congestion notification, the in-band telemetry congestion control engine 404 in the server device 208c may receive packets sent (at the reduced packet transmittal frequency) by the server device 208a, and identify that the in-band telemetry information provided in those packets by the switch devices indicate that the departure from the telemetry information baseline is no longer occurring (i.e., the switch identifier(s) in that in-band telemetry information correspond to those in the telemetry information baseline, the average queue occupancy of queue(s) in switch device(s) no longer exceed those in the telemetry information baseline, etc.) In some embodiments, following a departure from the telemetry information baseline at decision block 510, and then a return to the telemetry information baseline at decision block 516, the method 500 return to block 506 to determine a new telemetry information baseline at block 506, and the method 500 may repeat substantially as discussed above. As such, in some embodiments, any departure from the telemetry information baseline that is followed by a return to that telemetry information baseline, may result in a redetermination of the telemetry information baseline.

However, in other embodiments, a return to the telemetry information baseline at decision block 516 may cause the method 500 to return to block 508 to again receive the subsequent subset of packets. As such, in some embodiments, following a departure from the telemetry information baseline at decision block 510, and then a return to the telemetry information baseline at decision block 516, the destination device may transmit a decongestion notification to the source device that causes the source device to resume its previous packet transmittal frequency, and the method 500 return to block 508 to continue to receive packets routed through the network from the source device, with the method 500 then repeating substantially as discussed above. In yet another embodiment, the conditions that caused the telemetry information baseline to be exceeded may reach a steady state, and the in-band telemetry congestion control engine 404 in the server device 208c may determine a new telemetry information baseline that corresponds to those conditions. As such, a telemetry information baseline may be determined that corresponds to the network path 700 illustrated in FIG. 7, and the method 500 may then operate to subsequently determine whether that telemetry information baseline is exceeded in a manner that indicates congestion (or further congestion.)

Thus, systems and methods have been described that utilize in-band telemetry information provided in packets transmitted through a network in order to detect and control congestion in that network. For example, switch devices that transmit packets between a source device and a destination device in a network may provide switch device identifiers, queue occupancy data, and/or other in-band telemetry information in those packets, and a destination device may receive a first subset of the packets and use the in-band telemetry information in those packets to determine a telemetry information baseline that may include a sequence of switch device identifiers that identifies a network path of the packets, queue occupancies that identify the average queue occupancy of switch devices along a network path of the packets, and/or other telemetry information baselines. When the destination device receives a subsequent subset of packets, it will determine whether the in-band telemetry information in those packets indicates a departure from the telemetry information baseline that is indicative of a congestion situation introduced by, for example, a switch device failure in the original network path of the packets that caused those packets to be rerouted along a new network path, and may cause the destination device to generate a congestion notification and send that congestion notification to the source device, which causes the source device reduce its packet transmittal frequency as to not overwhelm the switch devices that provide the new network path.

In a specific example, the teachings of the present disclosure may be implemented in a Multi-Protocol Label Switching (MPLS) network in which Fast Re-Route (FRR) protection is available. In such an implementation, when the in-band telemetry information indicates different switch/router identifiers that are indicative of FRR activity (particularly in the case of facility protection), the congestion notifications will operate to decongest failed nodes or links in a manner similar to that described above.

Furthermore, with reference to FIG. 2 and multi-homing situation illustrated between the TOR switch devices 206c and 206d and the server device(s) 208d (which provides resiliency for those server device(s) 208d), data packet streams emanating from or directed to the server device(s) 208d may include the in-band telemetry information substantially as discussed above. When a departure from the telemetry information baseline occurs, the TOR switch devices 206c and 206c may operate to detect that departure, and then determine which route to the server device(s) 208d (e.g., the route provided by the TOR switch device 206c or the route provided by the TOR switch device 206d) should be advertised/prioritized over the other, which increases the health of the data packet streams to the server device(s) 208d. For example, in the event of the failure/unavailability of the leaf switch device 204c, the TOR switch device 206c may then prioritize reachability of the server device(s) 208d by withdrawing the route provided by the TOR switch device 206c to the server device(s) 208d. As such, in some embodiments, the switch devices in the in-band telemetry congestion control system 200 may include functionality that is similar to that of the destination device discussed above in identifying in-band telemetry information in packets, determining telemetry information baselines, and identifying when in-band telemetry information exceeds a telemetry information baseline.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An in-band telemetry congestion notification system, comprising:
   a source device that is configured to generate and transmit a plurality of packets;

a plurality of switch devices that are coupled together and to the source device, wherein each of the plurality of switch devices is configured to:
receive each of the plurality of packets transmitted by the source device;
provide in-band telemetry information in each of the plurality of packets; and
transmit each of the plurality of packets; and
a destination device that is coupled to the plurality of switch devices and configured to:
receive a first subset of the plurality of packets;
determine that a telemetry information baseline condition has been satisfied, wherein the telemetry information baseline condition includes at least one of:
a predetermined number of packets received by the destination device; or
a predetermined time period in which the destination device has received packets;
generate, in response to the telemetry information baseline condition being satisfied and using the in-band telemetry information included in each of the first subset of the plurality of packets, a telemetry information baseline;
receive, subsequent to determining the telemetry information baseline, a second subset of the plurality of packets;
determine, using the in-band telemetry information included in each of the second subset of the plurality of packets, a departure from the telemetry information baseline that indicates congestion and, in response, generate a congestion notification; and
transmit, via the plurality of switch devices to the source device, the congestion notification.

2. The system of claim 1, wherein the in-band telemetry information provided by each of the plurality of switch devices includes a switch device identifier.

3. The system of claim 2, wherein the telemetry information baseline includes a first sequence of a plurality of switch device identifiers included in the first subset of the plurality of packets that identify a first set of switch devices of the plurality of switch devices that provide a first network path for the first subset of packets, and wherein the detecting the departure from the telemetry information baseline that indicates congestion includes detecting a sequence of a plurality of switch device identifiers that are included in the second subset of the plurality of packets, and that are different than the first sequence to indicate that the second subset of the plurality of packets are provided on a second network path that includes a second set of switch devices of the plurality of switch devices.

4. The system of claim 1, wherein the in-band telemetry information provided by each of the plurality of switch devices includes queue occupancy data.

5. The system of claim 4, wherein the telemetry information baseline includes a queue occupancy range that is based on the queue occupancy data included in the first subset of the plurality of packets, and wherein the detecting the departure from the telemetry information baseline that indicates congestion includes detecting queue occupancy data included in the second subset of the plurality of packets that is outside the queue occupancy range.

6. The system of claim 1, wherein the source device is configured to:
reduce, in response to receiving the congestion notification, a frequency at which the plurality of packets are transmitted.

7. An Information Handling System (IHS), comprising:
a processing system; and
a memory system that is coupled to the processing system and that includes instructions that, when executed by the processing system, cause the processing system to provide an in-band telemetry congestion control engine that is configured to:
receive, via a plurality of switch devices, a first subset of a plurality of packets that were generated and transmitted by a source device;
determine that a telemetry information baseline condition has been satisfied, wherein the telemetry information baseline condition includes at leas one of:
a predetermined number of packets received; or
a predetermined time period in which packets are received;
generate, in response to the telemetry information baseline condition being satisfied and using in-band telemetry information provided in each of the first subset of the plurality of packets by at least some of the plurality of switch devices, a telemetry information baseline;
receive, via the plurality of switch devices and subsequent to determining the telemetry information baseline, a second subset of the plurality of packets that were generated by the source device;
determine, using the in-band telemetry information provided in each of the second subset of the plurality of packets by at least some of the plurality of switch devices, a departure from the telemetry information baseline that indicates congestion and, in response, generate a congestion notification; and
transmit, via the plurality of switch devices to the source device, the congestion notification.

8. The IHS of claim 7, wherein the in-band telemetry information provided by the at least some of the plurality of switch devices includes a switch device identifier.

9. The IHS of claim 8, wherein the telemetry information baseline includes a first sequence of a plurality of switch device identifiers provided in the first subset of the plurality of packets by the at least some of the plurality of switch devices that identify a first set of switch devices of the plurality of switch devices that provide a first network path for the first subset of packets, and wherein the detecting the departure from the telemetry information baseline that indicates congestion includes detecting a second sequence of a plurality of switch device identifiers that are included in the second subset of the plurality of packets that were provided by at least one of the plurality of switch devices, and that are different than the first sequence to indicate that the second subset of the plurality of packets are provided on a second network path that includes a second set of switch devices of the plurality of switch devices.

10. The IHS of claim 7, wherein the in-band telemetry information provided by the at least some of the plurality of switch devices includes queue occupancy data.

11. The IHS of claim 10, wherein the telemetry information baseline includes a queue occupancy range that is based on the queue occupancy data provided in the first subset of the plurality of packets by the at least some of the plurality of switch devices, and wherein the detecting the departure from the telemetry information baseline that indicates congestion includes detecting queue occupancy data that was provided in the second subset of the plurality of packets by the at least some of the plurality of switch devices and that is outside the queue occupancy range.

12. The IHS of claim 7, wherein the congestion notification is configured to cause the source device to reduce a frequency at which the plurality of packets are transmitted.

13. The IHS of claim 7, wherein the in-band telemetry configuration control engine is configured to:
   receive, via the plurality of switch devices and subsequent to transmitting the congestion notification, a third subset of the plurality of packet that were generated by the source device;
   determine, using the in-band telemetry information provided in each of the third subset of the plurality of packets by at least some of the plurality of switch devices, a return to the telemetry information baseline and, in response, generate a decongestion notification; and
   transmit, via the plurality of switch devices to the source device, the decongestion notification.

14. A method for providing in-band telemetry congestion control, comprising:
   receiving, by a destination device via a plurality of switch devices, a first subset of a plurality of packets that were generated and transmitted by a source device;
   determining, by the destination device, that a telemetry information baseline condition has been satisfied, wherein the telemetry information baseline condition includes at least one of:
      a predetermined number of packets received by the destination device; or
      a predetermined time period in which the destination device has received packets;
   generate, by the destination device in response to the telemetry information baseline condition being satisfied and using in-band telemetry information provided in each of the first subset of the plurality of packets by at least some of the plurality of switch devices, a telemetry information baseline;
   receiving, by the destination device via the plurality of switch devices and subsequent to determining the telemetry information baseline, a second subset of the plurality of packets that were generated by the source device;
   determining, by the destination device using the in-band telemetry information provided in each of the second subset of the plurality of packets by at least some of the plurality of switch devices, a departure from the telemetry information baseline that indicates congestion and, in response, generating a congestion notification; and
   transmitting, by the destination device via the plurality of switch devices to the source device, the congestion notification.

15. The method of claim 14, wherein the in-band telemetry information provided by the at least some of the plurality of switch devices includes a switch device identifier.

16. The method of claim 15, wherein the telemetry information baseline includes a first sequence of a plurality of switch device identifiers provided in the first subset of the plurality of packets by the at least some of the plurality of switch devices that identify a first set of switch devices of the plurality of switch devices that provide a first network path for the first subset of packets, and wherein the detecting the departure from the telemetry information baseline that indicates congestion includes detecting a second sequence of a plurality of switch device identifiers that are included in the second subset of the plurality of packets that are provided by at least one of the plurality of switch devices, and that are different than the first sequence to indicate that the second subset of the plurality of packets are provided on a second network path that includes a second set of switch devices of the plurality of switch devices.

17. The method of claim 14, wherein the in-band telemetry information provided by the at least some of the plurality of switch devices includes queue occupancy data.

18. The method of claim 17, wherein the telemetry information baseline includes a queue occupancy range that is based on the queue occupancy data provided in the first subset of the plurality of packets by the at least some of the plurality of switch devices, and wherein the detecting the departure from the telemetry information baseline that indicates congestion includes detecting queue occupancy data that was provided in the second subset of the plurality of packets by the at least some of the plurality of switch devices and that is outside the queue occupancy range.

19. The method of claim 14, wherein the congestion notification is configured to cause the source device to reduce a frequency at which the plurality of packets are transmitted.

20. The method of claim 14, further comprising:
   receiving, by the destination device via the plurality of switch devices and subsequent to transmitting the congestion notification, a third subset of the plurality of packet that were generated by the source device;
   determining, by the destination device using the in-band telemetry information provided in each of the third subset of the plurality of packets by at least some of the plurality of switch devices, a return to the telemetry information baseline and, in response, generate a decongestion notification; and
   transmitting, by the destination device via the plurality of switch devices to the source device, the decongestion notification.

* * * * *